United States Patent [19]
Tomita

[11] Patent Number: 5,662,979
[45] Date of Patent: Sep. 2, 1997

[54] SUBSTRATE FOR OPTICAL DISC

[75] Inventor: Takashi Tomita, Miyagi, Japan

[73] Assignee: Sony Corporation, Tokyo, Japan

[21] Appl. No.: 632,427

[22] PCT Filed: Aug. 25, 1995

[86] PCT No.: PCT/JP95/01696

§ 371 Date: Apr. 24, 1996

§ 102(e) Date: Apr. 24, 1996

[87] PCT Pub. No.: WO96/06431

PCT Pub. Date: Feb. 29, 1996

[30] Foreign Application Priority Data

Aug. 25, 1994 [JP] Japan ........................ 6-200876

[51] Int. Cl.$^6$ ........................ B32B 9/00
[52] U.S. Cl. ............ 428/64.1; 428/64.2; 428/64.3; 428/64.4; 428/332; 428/336; 428/64.7; 425/810; 430/321; 430/531; 369/275.2; 369/275.4; 264/1.1; 264/328.16
[58] Field of Search ................ 428/64.1, 64.2, 428/65, 64.3, 64.4, 332, 336; 264/1.1, 328.16; 425/810; 430/495, 321; 369/275.4, 275.2, 13, 288, 290, 271, 278

[56] References Cited

U.S. PATENT DOCUMENTS 5,470,627  11/1995  Lee et al. ........................ 428/64.4
5,521,901  5/1996  Dkada et al. ..................... 369/275.2
5,541,910  7/1996  Tanaka et al. .................... 369/290

*Primary Examiner*—Patrick Ryan
*Assistant Examiner*—Abraham Bahta
*Attorney, Agent, or Firm*—Limbach & Limbach LLP

[57] ABSTRACT

A substrate according to the present invention is applicable to an optical disc on which an information signal is recorded. Formed on the substrate are prepits in the form of irregularities which generates a tracking error signal upon detected. The substrate serving as a electro-acoustic transducer comprises a flat surface portion including at least a portion on which a recording layer and/or a reflecting film layer are formed, and plural pairs of prepits formed on the portion. Two prepits constituting each pair of the prepits are disposed at positions offset from a center of a virtual recording track such that the center of the virtual recording track is interposed between the two prepits. The substrate is produced by injection-molding a synthetic resin material having a light-permeability and has a thickness of 1 mm or less at the portion on which the recording layer and/or the reflecting film layer are formed. Thus, by restricting the thickness of the portion, on which the recording layer and/or the reflecting film layer are formed, to 1 mm or less, a pit-pattern of a stamper can be transferred to the substrate without any transferring deviation, when the substrate is injection-molded from the synthetic resin material.

10 Claims, 5 Drawing Sheets

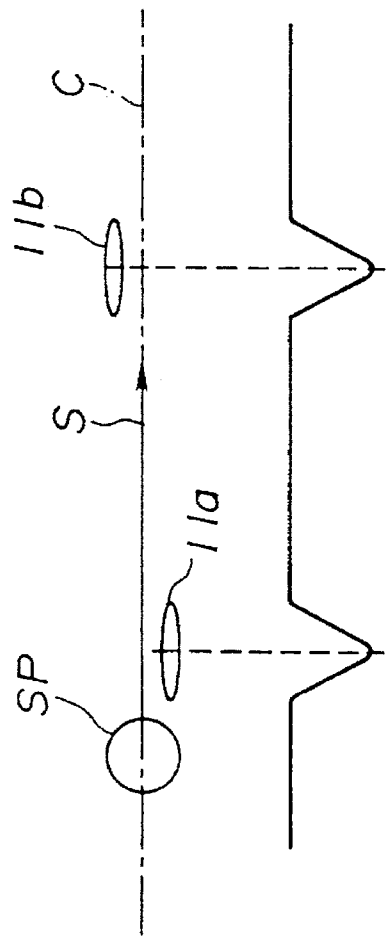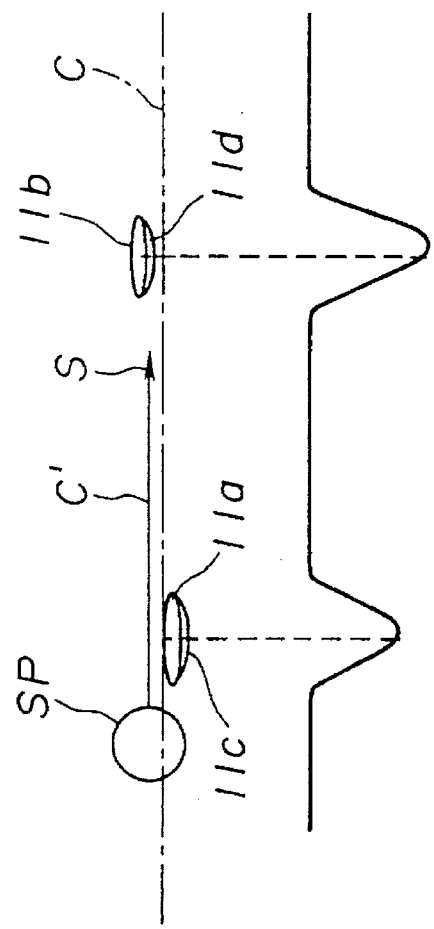

CENTER OF DISK

PIT FORMED ON SUBSTRATE
WITH 1.2mm THICKNESS

SUBSTRATE FOR OPTICAL DISC

TECHNICAL FIELD

This invention relates to a substrate for an optical disc on which an information signal is recorded, and more particularly to a disc substrate on which preliminary formed pits (hereinafter referred to as "prepit(s)") or grooves are provided to generate a tracking error signal.

BACKGROUND ART

Hitherto, an optical disc has been widely used as a recording medium for recording and/or reproducing an information signal by radiating a light beam on an information-recording surface thereof.

Such an optical disc known in the art includes an optical disc of a ROM (read only memory) type used only for reproducing an audio signal or an image signal already recorded thereon or reading out an information signal such as data signals, an optical disc of a DRAW (direct read after write) type on which an information signal is recordable in an unerasable manner only one time, a magneto-optical disc of a type capable of repeatedly recording and erasing an information signal thereon, or the like.

The optical disc of the ROM (read only memory) type includes a substrate made of a transparent material such as a synthetic resin or glass. Formed on a primary surface of the substrate as a signal-recording surface, are pits which are fine irregularities corresponding to the audio signal or other data signals recorded. The signal-recording surface of the substrate is covered with a reflecting film layer made of aluminum or the like.

Further, the magneto-optical disc capable of repeatedly recording the information signals also includes a substrate made of a transparent material such as a synthetic resin and glass, on a primary surface of which a vertically magnetized thin film layer having magneto-optical properties such as a Kerr effect or a Farady effect is formed. The vertically magnetized thin film layer is also covered with a reflecting film layer made of aluminum or the like. The vertically magnetized thin film layer of the magneto-optical disc, which serves as a signal recording layer, has been made of an amorphous alloy of a rare-earth element and a transition metal such as a Tb—Fe—Co alloy and the like.

Furthermore, the optical disc of a DRAW (direct read after write) type has a substrate made of a transparent material such as a synthetic resin and glass. Formed on a primary surface of the substrate is a signal-recording film layer composed of a low-melting metal thin film layer, a phase-changing film layer, an organic dye-containing film layer, or the like. In such an optical disc of the DRAW (direct read after write) type, the signal-recording film layer is also covered with a reflecting film layer made of aluminum, or the like.

Meanwhile, a huge number of optical discs have been used as a recording medium for an information signal-recording and/or reproducing apparatus. Therefore, it is desirable that the optical discs are produced with a high mass productivity and a low manufacturing cost. In order to meet such requirements, the substrate for the optical disc is obtained and widely used in the form of an injection-molded article made of a synthetic resin such as a polycarbonate resin.

The substrate used for the optical disc of the ROM type is formed with data pits which are fine irregularities corresponding to the audio signal or the image signal recorded.

The recording tracks are formed on the substrate in a concentric or spiral relation to a center of the substrate of the optical disc. In the recording tracks, there are formed prepits which generate tracking error signals for controlling a scanning position of the light beam to be radiated to the surface of the optical disc, when detected.

Further, in the magneto-optical disc capable of repeatedly recording the information signals or the optical disc of the DRAW (direct read after write) type, the substrate is formed thereon with prepits which are in the form of fine irregularities arranged along virtual recording tracks disposed concentrically or spirally relative to the center of the substrate of the optical disc.

In the optical disc of the ROM (read only memory) type, it is required to accurately scan the recording track by the light beam serving for reading out the information signal so that the information signal recorded on the optical disc can be exactly reproduced. Further, in order to perform an exact recording of the information signals on the magneto-optical disc or the optical disc of the DRAW (direct read after write) type, the light beam for recording the information signals is required to exactly scan the recording tracks on which the information signals are to be recorded.

Consequently, in the case of the recording and/or reproducing apparatus in which the optical disc of the ROM (read only memory) type or the optical disc capable of recording the information signals is used as a recording medium, a tracking control is carried out to control a position of the light beam relative to the recording track on the optical disc so as to cause the light beam to exactly follow the recording track. For the purpose of such a tracking control, the prepits are formed on the optical disc and detected by the light beam so that a tracking control signal capable of controlling the scanning position of the light beam is generated. On the basis of the detection output of the tracking control signal, a position of the objective lens is controlled such that the light beam radiated is focussed or converged onto the aimed recording track of the optical disc.

Incidentally, a sampling servo system is known as a system for realizing the tracking control in which the light beam radiated is controlled so as to exactly follow the recording track of the optical disc. In the optical disc used in the sampling servo system, the recording tracks on which the audio signal or other information signals are to be recorded are divided into a plurality of data areas in each of which two prepits are formed. The prepits generate a tracking control signal for controlling the scanning position of the light beam when detected. As shown in FIG. 1A, the prepits 11a and 11b are provided on the opposite sides of a center line C of a recording track formed on the optical disc in such a manner that these prepits are spaced at a predetermined distance from each other in the scanning direction of the light beam. The two prepits 11a and 11b are so arranged as to be offset relative to the center line C in such a manner that they sandwich the center line C of the width of a virtual recording track. Specifically, the two prepits 11a and 11b are in the form of irregularities each located at a position which is spaced at a distance of one-fourth of the width of the recording track apart from the center line C in the radial direction of the optical disc, namely in the direction perpendicular to the center line C of the recording track. Hereinafter, the prepit 11a which is located rearward relative to the scanning direction of the light beam and therefore first radiated by the light beam when scanned in the direction indicated by an arrow S in FIG. 1A, and the prepit 11b which is radiated by the light beam after the prepit 11a is radiated by the light beam, are referred to as "the first prepit" and "the second prepit", respectively.

As mentioned above, in the tracking control in which the two prepits 11a and 11b formed on the optical disc are employed, the returning light beams reflected on the first and second prepits 11a and 11b are detected by a detecting device to obtain the respective detection outputs which are then compared with each other whereby a tracking error signal is obtained. Thereafter, the objective lens driving device is operated on the basis of this tracking error signal to control the movement or displacement of an objective lens through which the light beam to be radiated is focussed or converged onto the recording track. As a result, the tracking control is performed such that the light beam radiated through the objective lens onto the optical disc can follow the recording track exactly.

At this time, in the case where a beam spot SP of the light beam to be converged through the objective lens and radiated on the optical disc, is scanning along the center line C of the recording track, the detection output levels obtained from the first and second prepits 11a and 11b are identical, as shown in FIG. 1B. On the other hand, if the beam spot SP of the light beam is scanning along a path offset from the center line C of the recording track to a side near the first prepit 11a, the detection output level obtained from the first prepit 11a is higher than that obtained from the second prepit 11b. To the contrary, if the beam spot SP of the light beam is scanning along a path offset from the center line C of the recording track to a side near the second prepit 11b, the detection output level obtained from the second prepit 11b is higher than that obtained from the first prepit 11a. Accordingly, a deviation, i.e., a tracking error of the beam spot SP relative to the recording track can be detected by obtaining the difference between the detection output levels from the first and second prepits 11a and 11b. A tracking error signal generated by the detection of the tracking error controls an operation of the objective lens driving device so that the objective lens thereon is displaced so as to cause the light beam to be radiated onto the optical disc to follow the recording track exactly. Thus, the tracking control can be performed in a proper manner.

In the sampling servo system, the prepits formed on the optical disc are used as a reference for determining a clock phase which is used at a time when an information signal recorded on the recording track should be reproduced. Consequently, in the case of the optical disc used in the sampling servo system, in order to cause the light beam to scan the recording track exactly and enable an exact read-out (reproduction) of the information signal recorded on the recording track without omission thereof, it is required to exactly form the prepits each having a given size at given positions on the optical disc.

Meanwhile, as described hereinbefore, the substrate constituting the optical disc is prepared by the injection-molding of a synthetic resin material such as a polycarbonate resin having a light-permeability.

The substrate made of the synthetic resin is produced by injecting a melt of the synthetic resin material such as a polycarbonate resin into a die in which there is disposed a stamper having a pit-pattern reverse to shapes of the prepits or the data pits corresponding to the information signals to be recorded on the optical disc. In this case, the die is maintained in a closed state. Next, the die is compressed while cooling so that the pit-pattern of the stamper is transferred to the synthetic resin material injected thereinto. After curing the melt of the synthetic resin material injected into the die, the die is opened to release the cured synthetic resin material from the stamper whereby the substrate for the optical disc is obtained.

In the above-mentioned molding process of the substrate, there occurs a risk that the transferred pit-pattern formed on the cured article deviates from those on the stamper due to thermal shrinkage of the synthetic resin material of the substrate upon curing.

That is, when the substrate is prepared from a synthetic resin material by using an injection molding process, the melt having an elevated temperature upon its injection into the die undergoes a decrease in its temperature when the die is cooled for curing so that a shrinkage force is caused in an interior of the shaped substrate. This stress or shrinkage force significantly occurs at a region between the pit-pattern of the stamper and prepits correspondingly formed on the shaped substrate. The stress concentrated at the region between the pit-pattern of the stamper and the prepits correspondingly formed on the substrate causes a deviation between the pit-patterns of the stamper and the prepits formed on the substrate when the molded substrate is released from the die. That is, the pit-pattern of the stamper cannot be exactly transferred to the molded substrate so that the transferring deviation of the pit-pattern occurs.

When the transferring deviation occurs, the respective prepits 11a and 11b, which are not consistent with the pit-pattern of the stamper, are continuously formed with deformed portions 11c and 11d as shown in FIG. 2A. The deformed portions 11c and 11d are of such a shape that one side of each prepit is stretched toward the right side thereof when viewed along the scanning direction S of the beam spot SP. Once such the deformed portions 11c and 11d are formed in the first and second prepits 11a and 11b due to the transferring deviation upon molding, there occurs a difference between the detection output levels of the first and second prepits 11a and 11b as shown in FIG. 2B even though the beam spot SP is scanning exactly along the center line C of the recording track on which the information signals are recorded. In the case that a center position of the recording track should be determined by the difference in the detection output levels between the first and second prepits 11a and 11b, the center position of the recording track is erroneously detected as if it is located on a wrong center line C' which deviates from the inherent center line C, as shown in FIG. 2A. As a result, an exact tracking control for scanning of the recording track by the light beam cannot be achieved.

Thus, owing to the transferring deviation of the first and second prepits 11a and 11b from the pit-pattern of the stamper, the clock phase used upon reproduction of the data signals recorded on the optical disc suffers from undesired phase shift so that recording of the information signals on the optical disc and/or reproduction thereof from the optical disc cannot be exactly performed.

DISCLOSURE OF THE INVENTION

Accordingly, it is an object of the present invention to provide a substrate for an optical disc, on which a portion serving for generating a tracking error signal and a recording portion serving for recording an information signal can be formed accurately.

It is another object of the present invention to provide a substrate for an optical disc, which enables a pit-pattern of a stamper to be accurately transferred thereonto so that an exact tracking control and an exact rotational-drive control of the optical disc can be performed.

In order to accomplish the above-mentioned objects, in accordance with the present invention, the substrate for the optical disc is provided with a flat surface portion including at least a portion on which a recording layer and/or a reflecting layer are formed, and a portion for generating a tracking error signal. The substrate is made of a synthetic resin material and at least a portion where the above-mentioned recording layer and/or reflecting layer has a thickness of 1 mm or less.

Further, a plurality of phase-determining pits are provided at the portion where the recording layer and/or reflecting layer are formed.

Furthermore, in addition to the flat surface portion on which the recording layer and/or the reflecting layer are formed, the substrate is provided thereon with plural pairs of prepits. The two prepits constituting each pair of the prepits are located at positions offset from a center line of a virtual recording track towards the opposite sides so as to sandwich the center line. The substrate is produced by injection-molding of a synthetic resin having a light-permeability such that at least the portion on which the above-mentioned recording layer and the reflecting layer are formed has a thickness of 1 mm or less.

In accordance with the present invention, since the thickness of the portion on which the recording layer and/or the reflecting layer are formed, is restricted to 1 mm or less, the substrate shows a low internal stress when subjected to a cooling process required for curing the injection-molded substrate, so that the transferring deviation of the pits from the pit-pattern of the stamper, which occurs due to the stress is effectively prevented.

Further and other objects and advantages of the present invention will become more apparent from the detailed description of preferred embodiments with reference with the accompanying drawings.

BRIEF DESCRIPTION OF THE DRAWINGS

FIG. 1A is a diagrammatic illustration showing first and second servo pits formed on a substrate to perform a sample servo tracking, and FIG. 1B is a diagrammatic illustration showing detection outputs obtained from the first and second servo pits when a beam spot of the light beam is scanning along a center line of a recording track formed on an optical disc.

FIG. 2A is a diagrammatic illustration showing the first and second servo pits formed on an injection-molded substrate to perform a sample servo tracking, which are located at positions offset from their inherent positions due to a transferring deviation, and FIG. 2B is a diagrammatic illustration showing detection outputs obtained from the first and second servo pits.

BEST MODE FOR CARRYING OUT THE INVENTION

A substrate for an optical disc according to the present invention is now described in mope detail by referring to the accompanying drawings.

Figure 3:
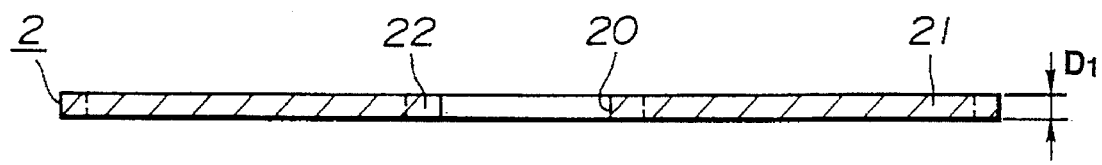
FIG. 3 is a sectional view of a substrate for an optical disc according to the present invention.

The optical disc produced by using the substrate according to the present invention includes a transparent substrate having a light-permeability and a reflecting film layer formed of a thin film of metal such as aluminum and disposed on the transparent is substrate. The substrate 2 constituting the optical disc produced by injecting a synthetic resin material such as transparent polycarbonates into a die to obtain such an injection-molded article as shown in FIG. 3. The thus produced substrate 2 is formed with a central bore 20. The substrate 2 has a recording area 21 on which an information signal should be recorded. The recording area 21 is located in an area excluding the central bore 20 and its peripheral portion and an outer peripheral portion of the substrate, namely an area extending from the peripheral portion of the central bore 20 to the portion in the vicinity of the outer peripheral edge. Meanwhile, the substrate 2 has a uniform thickness $D_1$ over an entire portion thereof. Further, the recording area 21 has a flat surface. The peripheral portion of the central bore 20, which cannot be used as a recording portion, serves as a chuck portion 22 which is engaged with a rotational-drive mechanism of a disc recording and/or reproducing apparatus when the optical disc is loaded thereon.

In a case where the substrate 2 is applied to a magneto-optical disc capable of repeatedly recording an information signal, the substrate is provided on one side surface thereof with a vertically magnetized film layer having magneto-optical properties such as a Kerr effect and a Faraday effect, and a reflecting film layer disposed over the vertically magnetized film layer and formed of aluminum or the like. Meanwhile, the reflecting film layer may be covered with a protective layer formed of the same material as that of the substrate 2.

The vertically magnetized film layer serving as a signal-recording layer of the magneto-optical disc may be an amorphous alloy film made of a rare earth element/a transition metal alloy such as Tb—Fe—Co alloy.

On the substrate 2 constituting the magneto-optical disc capable of repeatedly recording an information signal, virtual recording tracks are arranged in a concentric or helical relation to a center of the substrate 2 such that the center of the substrate and the center of the recording tracks are approximately in consistent with each other. The virtual recording tracks are actualized by recording the information signal such as an audio signal thereon.

The recording track on which the information signal is recorded is divided into a plurality of data areas. In each area of the recording track, a pair of prepits are formed to generate a tracking control signal for controlling a scanning position of a light beam. That is, the substrate 2 proposed above is applied to a substrate for an optical disc used in a sample servo method.

Figure 4:
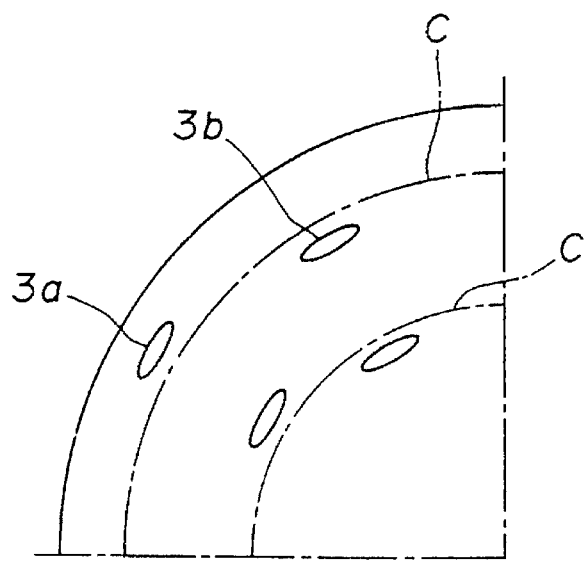
FIG. 4 is an enlarged plan view showing essential parts of prepits formed on the substrate of the optical disc.

As shown in FIG. 4, when applied to the optical disc used in the sample servo method, the substrate 2 is formed with the two prepits 3a and 3b for generating a tracking control signal by which the scanning position of the light beam is controlled. The two prepits 3a and 3b are so disposed that they are spaced at a predetermined distance apart from each other in the scanning direction of the light beam in such a manner as to sandwich the center line C of the recording track formed on the optical disc such that the center line C of the virtual recording track is interposed therebetween, as shown in FIG. 4. Further, the two prepits 3a and 3b are offset from the center line C of the virtual recording track formed on the optical disc. Specifically, the two prepits 3a and 3b are in the form of recesses which are located at positions spaced at a distance of one-fourth of the width of the recording track apart from the center line C of the recording track in the radial direction of the optical disc.

In the optical disc produced by using the substrate 2, the first and second prepits 11a and 11b are radiated by the light beam and reflecting light beams therefrom are detected to obtain detection outputs levels of Which are then compared with each other whereby a tracking error signal can be generated, if any tracking error is found. The tracking error signal is used to control an operation of an objective lens driving device such that an objective lens is driven and displaced to focus or converge the light beam and radiate the light beam onto the recording track. As a result, a tracking control is performed so as to cause the light beam radiated onto the optical disc to follow the recording track exactly.

The substrate 2 according to the present invention can be produced by injection-molding of a synthetic resin material such as an acrylic resin, a polycarbonate resin, a polyolefin resin, an epoxy resin or the like. In advance of producing the substrate 2 by the injection molding process, a stamper 1 having a pit-pattern reverse to the pattern of the first and second prepits 3a and 3b formed on the substrate 2 for generating the tracking control signal is prepared.

The stamper 1 used in the injection molding process may be made of a metal such as nickel and produced by using an electro-casting method.

The stamper 1 is disposed in a die for shaping the substrate 2. Then, a melt of a starting synthetic resin material such as a polycarbonate resin for the substrate 2 is injected into the die in which the stamper 1 is disposed. Upon injection of the melt of the synthetic resin material into the die, the die mounting the stamper 1 is maintained in a closed state. After the synthetic resin material is injected into the die, the die is pressed while cooling so that the pit-pattern formed on the stamper 1 is transferred onto the synthetic resin material. After completing the cooling and curing processes of the synthetic resin material injected into the die, the die is opened to release the cured article from the die whereby the shaped substrate 2 for an optical disc can be obtained.

Figure 5:
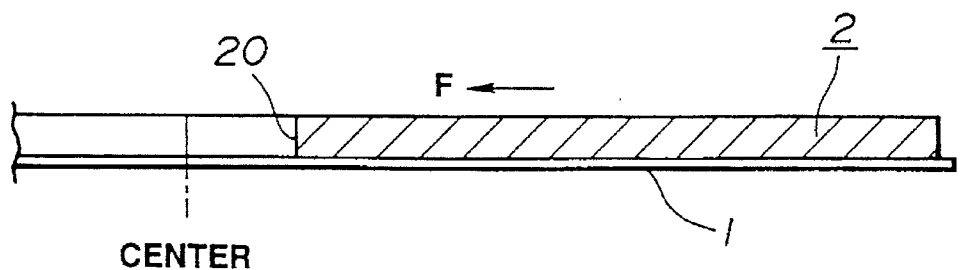
FIG. 5 is a side view explaining a direction of a stress generated between the substrate and the stamper when the substrate is injection-molded in a die.

Incidentally, as already mentioned above, in the course of cooling the synthetic resin material in the injection molding process in which the substrate 2 is produced by using the die, the substrate 2 suffers from an internal stress F exerted in such a direction as indicated in FIG. 5 so as that the substrate 2 is subjected to undesirable shrinkage oriented in the radial and inward direction. As mentioned above, the stress F is concentrated on a region between the pit-pattern formed on the stamper 1 and the prepits 3 correspondingly formed on the substrate 2. The stress F exerted to the region between the pit-pattern of the stamper 1 and the prepits 3 of the substrate 2 is released upon removal of the substrate 2 from the stamper 1 so that a shrinkage force is generated in the substrate 2. This results in deformation of the prepits 3 whereby a transferring deviation between the pit-pattern of the stamper 1 and the prepits 3 of the substrate 2 is caused.

Consequently, in order to prevent occurrence of the transferring deviation by which the pit-pattern of the stamper 1 is not accurately transferred onto the substrate 2, it is necessary to limit the stress F, which is generated inside the substrate 2 during the cooling process of the injection-molded substrate 2 so as to shrink it radially and inwardly, to a lower level so that the stress F is prevented from being concentrated on a region between the pit-pattern of the stamper 1 and the prepits 3 of the substrate 2. Further, it is suggested that the reduction of the stress F generated inside the substrate 2 during the cooling process can be realized by lessening the thickness $D_1$ and rigidity of the substrate 2 to be shaped.

Under this circumstance, the measurement was made to confirm the above suggestion as follows. First, a melt of a polycarbonate resin was injected into a die in which the stamper 1 having a pit-pattern was disposed, to produce substrates 2 having different thicknesses $D_1$ but each having an identical outer diameter of approximately 90 mm and an identical central bore 20 of approximately 15 mm. Each of the substrates was cooled down from 300° C. to 100° C. and then subjected to the measurement of the stress F generated at the respective positions in the radial direction between the prepits 3a and 3b of the substrate 2 and the pit-pattern of the stamper 1. In the case of the injection-molded substrate 2 having a thickness $D_1$ of 1.2 mm, the stress F generated in the radial direction and measured at the substrate 2 portion located between the prepits 3 of the substrate 2 and the pit-pattern of the stamper 1 was indicated by the curve A in FIG. 8. Further, in the case of the injection-molded substrate 2 having a thickness $D_1$ of 1.0 mm, the stress F generated in the radial direction and measured at the substrate 2 portion located between the prepits 3 of the substrate 2 and the pit-pattern of the stamper 1 was indicated by the curve B in FIG. 6. In addition, in the case, of the injection-molded substrate 2 having a thickness $D_1$ of 0.8 mm, the stress F generated in the radial direction and measured at the substrate portion located between the prepits 3a and 3b of the substrate 2 and the pit-pattern of the stamper 1 was indicated by the curve C in FIG. 6.

Figure 6:
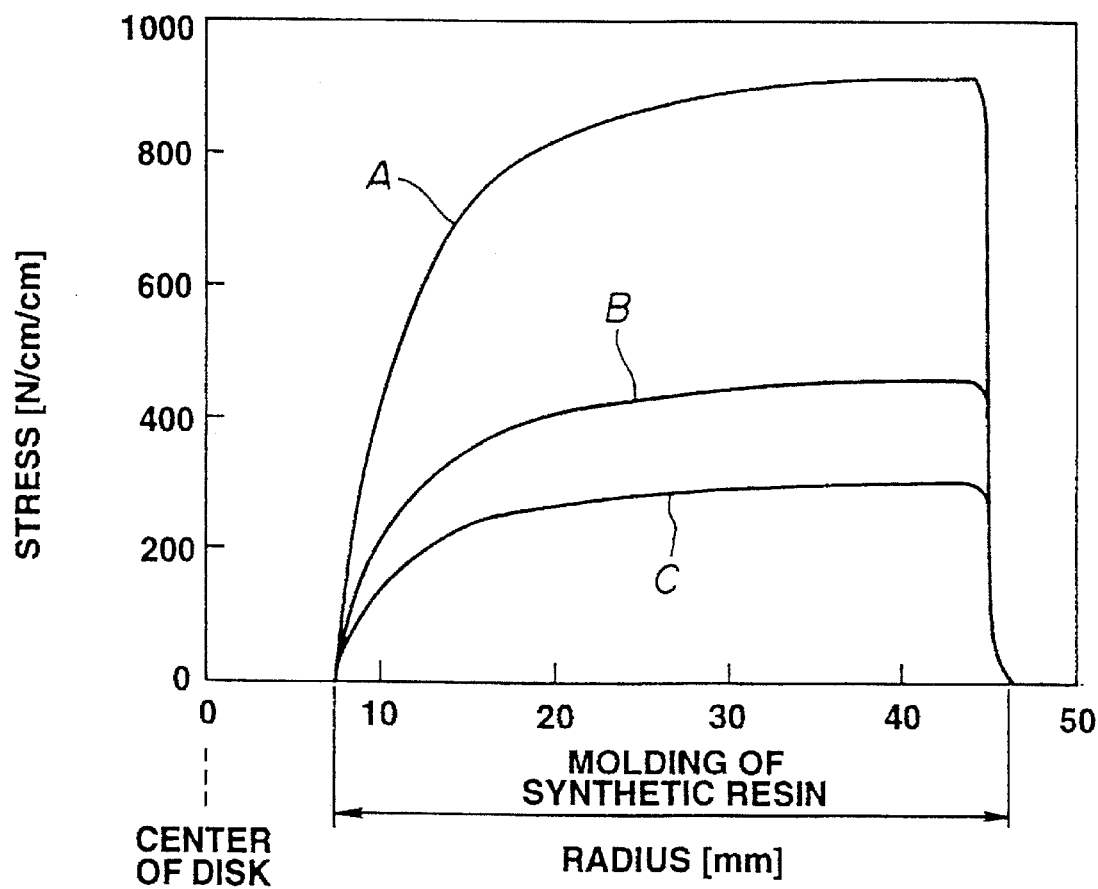
FIG. 6 is a graph showing characteristic curves of a magnitude of a stress generated between the substrate and the stamper with respect to injection-molded substrates having different thicknesses.

As is apparently appreciated from the results shown in FIG. 6, the stress F of the substrate 2 having a thickness $D_1$ of 1.0 mm, which is generated at a position between the prepits 3 of the substrate 2 and the pit-pattern of the stamper 1, is about one-half of the stress F of the substrate 2 having a thickness $D_1$ of 1.2 mm, and the stress F of the substrate 2 having a thickness $D_1$ of 0.8 mm is about one-third of the stress F of the substrate 2 having a thickness $D_1$ of 1.2 mm.

Next, the shapes of the prepits 3 formed on the substrates 2 having thicknesses $D_1$ of 0.8 mm and 1.2 mm were observed by using AFM (interatomic bonding force microscope). From the results of the observation, it was confirmed that the prepits 3 of the substrate 2 having a thickness $D_1$ of 0.8 mm has such a shape as shown in FIG. 7 and the prepits 3 of the substrate 2 having a thickness $D_1$ of 1.2 mm has such a shape as shown in FIG. 8.

Figure 9:
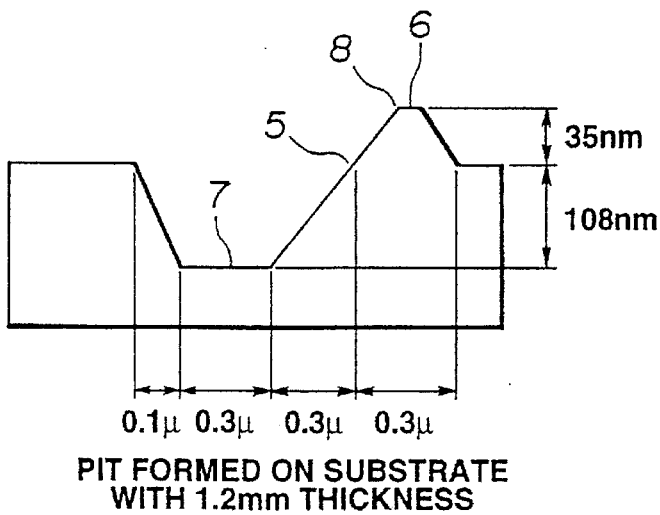
FIG. 9 is a sectional view showing a shape of the prepit formed on the substrate having a thickness of 1.2 mm.

The shape of the prepits 3 formed on the substrate 2 having a thickness $D_1$ of 1.2 mm was indicated in a diagrammatic illustration of FIG. 9 on the basis of the results of the observation. Incidentally, the dimensions of the respective portions of the prepits 3 which were obtained by the calculation of the measured values are also shown in FIG. 9.

Figure 7:
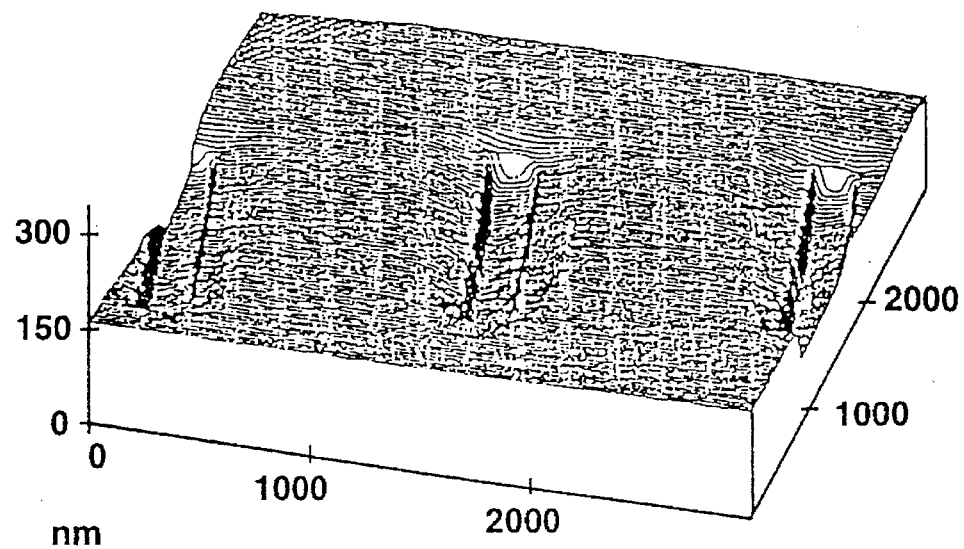
FIG. 7 is a diagrammatic illustration showing shapes of the prepits formed on the substrate having a thickness of 0.8 mm, on the basis of the measurement results of AFM (interatomic bonding force microscope).
Figure 8:
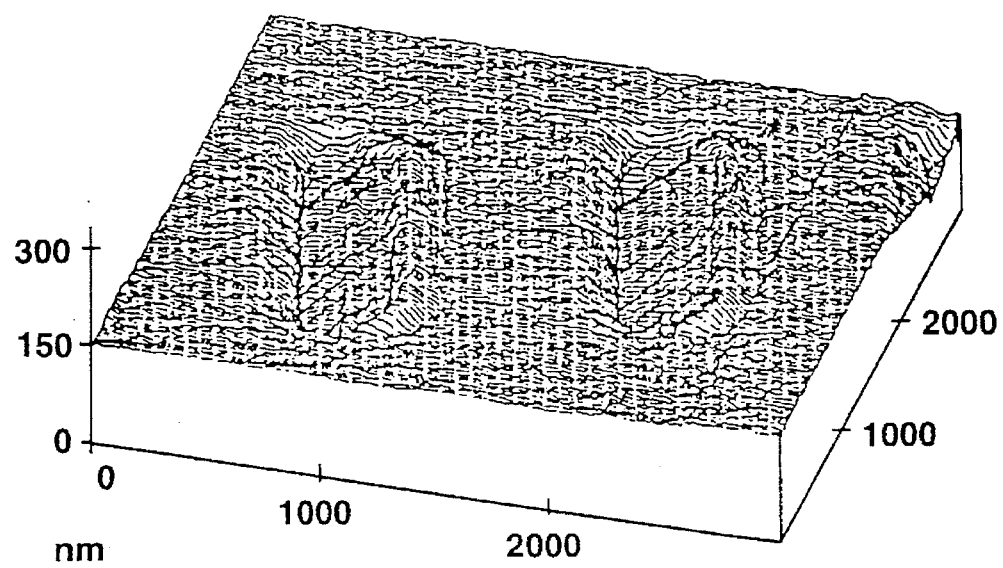
FIG. 8 is a diagrammatic illustration showing shapes of the prepits formed on the substrate having a thickness of 1.2 mm, on the basis of the measurement results of AFM (interatomic bonding force microscope).

As is apparently appreciated from FIG. 7, the prepits 3 formed on the substrate 2 having a thickness $D_1$ of 0.8 mm has a shape which did not suffer from deformation due to the transferring deviation and therefore corresponds accurately to the pit-pattern formed on the stamper 1. On the other hand, as shown in FIGS. 8 and 9, each of the prepits 3 formed on the substrate 2 having a thickness $D_1$ of 1.2 mm is of a recessed shape which has a large slant surface 5 moderately inclined rightward particularly as shown in FIG. 9. Further, an upwardly swelled portion 6 is formed at an upper end of the large slant surface 5. As a result, an outer or upper open end 8 of each of the prepits 3 is large in diameter than an inner or lower bottom end 7 thereof. Namely, the prepits 3 formed on the substrate 2 having a thickness $D_1$ of 1.2 mm are so deformed that the open end of each prepit 3 is expanded toward one side thereof as compared with the pit-pattern formed on the stamper 1. The deformed portion of the prepits 3 in the form of an expanded recess which is constituted by the large slant surface 5 and the upwardly swelled portion 6, corresponds to the portion causing the transferring deviation.

As mentioned above, the stress F generated inside of the substrate 2 during the cooling step thereof in the die so as to shrink it radially inwardly, can be reduced by limiting the thickness $D_1$ of the substrate 2 to 1 mm or less. As a result, the stress F concentrated at a region between the pit-pattern formed on the stamper i and the prepits $3a$ and $3b$ formed on the substrate 2 can be also reduced so that the transferring deviation from the pit-pattern is prevented from occurring upon releasing the substrate 2 from the stamper 1 and the shape of the prepits 3 is permitted to correspond exactly to the pit-pattern of the stamper 1.

Figure 10:
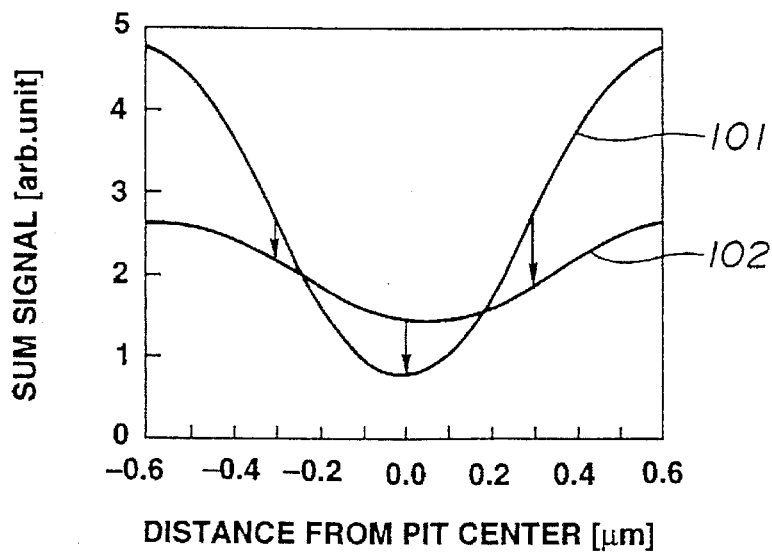
FIG. 10 is a graph showing characteristic curves in which the detection signals generated at the prepits formed without transferring deviation are compared with the detection signals generated at the prepits suffering from transferring deviation.

In order to confirm the above fact, the optical disc produced by using the substrate 2 with the first and second prepits $3a$ an $3b$ accurately formed without the transferring deviation as shown in FIG. 7 and the optical disc produced by using the substrate 2 with the first and second prepits $3a$ and $3b$ suffering from the transferring deviation as shown in FIGS. 8 and 9, were subjected to the detection by which a sum of the sampling values of the respective optical discs was obtained. The results of the detection are shown in FIG. 10. As is apparent from FIG. 10, a signal indicative of the sum obtained from the optical disc 102 produced by using the substrate 2 with the first and second prepits $3a$ and $3b$ suffering from the transferring deviation, shows a smaller changing rate of the deviation from the center of the recording track than a signal indicative of the sum obtained from the optical disc 101 produced by using the substrate 2 with the first and second prepits $3a$ and $3b$ accurately formed without the transferring deviation. Further, the signal indicative of the sum of the sampling values obtained from the optical disc 102 detects a wrong center position of the recording track which deviates from the actual center position of the recording track. Consequently, the transferring deviation of the prepits 3 formed on the substrate 2 leads to a low capacity of the detection of the tracking error which makes it difficult to perform the tracking control at high accuracy. In addition, there is likely to occur a risk that a read-out of the information signal from the recording track is no longer possible.

As mentioned above, in order to provide an optical disc capable of exactly reproducing the information signal recorded on the recording track by accurately performing the tracking control, it is required at least to form the substrate 2 without the transferring deviation of the prepits 3 which are used for generating the tracking error signal. Further, the formation of the substrate 2 without the transferring deviation of the prepits 3 can be realized by using the substrate having a thickness $D_1$ of 1 mm or less.

Incidentally, in a case where the substrate is prepared by injection-molding of a synthetic resin material, the thickness $D_1$ of the substrate 2 is required to be 0.1 mm or greater to maintain its mechanical strength and manufacturing accuracy.

When the above-mentioned substrate 2 is used to manufacture a magneto-optical disc, a vertically magnetized film layer made of a rare earth element-transition metal amorphous alloy such as Tb—Fe—Co alloy having magneto-optical properties such as a Kerr effect and a Farady effect is deposited on a surface of the substrate 2 on the side where the prepits 3 are formed. The vertically magnetized film layer is further covered with a reflecting film layer made of aluminum or the like.

When the above-mentioned substrate 2 is used to manufacture an optical disc of the DRAW (direct read after write) type, the surface of the substrate 2 on the side where the prepits 3 are formed is in turn covered with a low-melting metal thin film layer, a phase-changing film layer and an organic pigment-containing film layer. On these film layers, there is also provided a reflecting film layer made of aluminum or the like.

Further, when the above-mentioned substrate 2 is used to manufacture an optical disc of ROM (read only memory) type, data pits in the form of irregularities corresponding to the information signals are formed on the recording track together with the prepits 3. Namely, the substrate 2 used for manufacturing the optical disc of ROM (read only memory) type is molded in the die by using a stamper 1 on which a pit-pattern corresponding to the data pits of the information signals is formed as well as that of the prepits 3. The optical disc of ROM (read only memory) type is finished by forming a reflecting film layer made of aluminum or the like on a surface thereof on which the data pits and the prepits 3 are formed.

Figure 11:
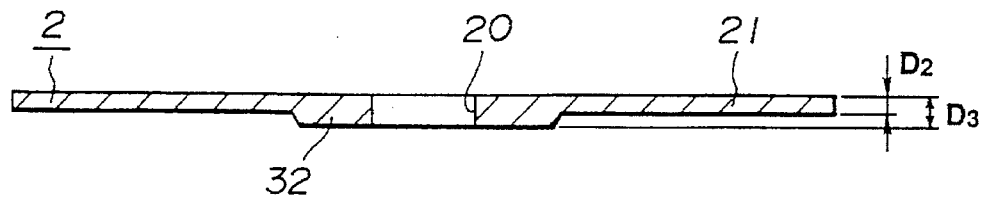
FIG. 11 is a sectional view showing a substrate for an optical disc according to another embodiment of the present invention.

As mentioned above, the substrate 2 has a uniform thickness $D_1$ over its entire portion including a peripheral portion of the central bore 20 and the recording area 21 on which the information signal can be recorded. Alternatively, in order to avoid the occurrence of warpage or deformation on the optical disc and maintain its mechanical strength, as shown in FIG. 11, the peripheral portion of the central bore 20 on which no prepit is formed may be larger in thickness than a portion on which the recording area 21 is formed. Namely, in order to prevent the transferring deviation of the prepits 3 formed on the substrate 2, a thickness $D_2$ of the portion on which the recording area 21 is provided is suitably 1 mm or less and the peripheral portion of the central bore 20 which does not serve for recording the information signal has a larger thickness $D_3$ than that of the recording area 21. It is preferred that the thickness $D_2$ of the portion on which the recording area 21 is provided is 0.8 mm and the thickness $D_3$ of the peripheral portion of the central bore 20 is in the range of 1.2 to 1.3 mm. The portion having the larger thickness $D_3$ is in the form of a swell projected toward the side opposite to the data-recorded surface of the substrate 2 and constitutes a chuck portion 32 at which a finished optical disc is engaged with a disc-operating mechanism of a recording and/or reproducing apparatus upon use. Consequently, the substrate 2 of such a construction is also formed with a flat surface on the side where the signal-recording layer and/or the reflecting film layer are provided on the recording area 21.

Meanwhile, a shape of the portion serving for generating the tracking error signal is not restricted to the prepits 3 but an elongated grooves are also employable for this purpose.

INDUSTRIAL APPLICABILITY

The substrate for an optical disc according to the present invention has a flat surface on which the signal-recording layer and/or the reflecting film layer are provided. Formed on the flat surface of the substrate is plural pairs of the prepits which are disposed at positions offset from a center of a virtual recording track. The two prepits constituting each pair of the prepits are located such that the center line of the virtual recording track is interposed therebetween. The substrate is produced by the injection-molding of a synthetic resin material having a light-permeability and has a thickness of 1 mm or less at least at a portion where the signal-recording layer and/or the reflecting film layer are provided. As a result, the prepits can be formed on the substrate-without the transferring deviation when it is the injection-molding of the starting synthetic resin material.

What is claimed is:

1. A substrate for an optical disc comprising:

a flat surface portion including at least a portion on which a recording layer and/or a reflecting film layer are formed; and a portion capable of generating a tracking error signal, said substrate being formed of a synthetic resin material and having a thickness of 1 mm or less at least at said portion on which the recording layer and/or the reflecting film layer are formed.

2. The substrate for an optical disc according to claim 1, wherein said tracking error signal portion comprises pre-pits formed in said tracking error signal portion.

3. The substrate for an optical disc according to claim 1, wherein said substrate is made of a polycarbonate resin.

4. A substrate for an optical disc comprising:

a flat surface portion including at least a portion on which a recording layer and/or a reflecting film layer are formed; and plural pairs of prepits formed on said portion on which the recording and/or a reflecting film layer are formed, the two prepits constituting each pair of said prepits being disposed at positions offset from a center of a virtual recording track such that the center of the virtual recording track is interposed between said two prepits, wherein said substrate is formed by injection-molding a synthetic resin material having a light-permeability and a thickness of said portion on which the recording layer and/or the reflecting film layer are formed, is 1 mm or less.

5. The substrate for an optical disc according to claim 4, wherein said thickness of said portion on which the recording layer and/or the reflecting film layer are formed, is 0.8 mm.

6. The substrate for an optical disc according to claim 4, further comprising:

an opening formed on an inner periphery of said portion on which the recording layer and/or the reflecting film layer are formed; and a chuck portion formed continuously with said portion on which the recording layer and/or the reflecting film layer are formed, a thickness of said chuck portion being approximately the same as a thickness of said portion on which the recording layer and/or the reflecting film layer are formed.

7. The substrate for an optical disc according to claim 4, further comprising:

an opening formed on an inner periphery of said portion on which the recording layer and/or the reflecting film layer are formed; and a chuck portion formed continuously with said portion on which the recording layer and/or the reflecting film layer are formed, a thickness of said chuck portion being larger than a thickness of said portion on which the recording layer and/or the reflecting film layer are formed.

8. A substrate for an optical disc, said substrate being formed from a synthetic resin material selected from the group consisting of acrylic resin, polyolefin resin, epoxy resin and polycarbonate resin, said substrate including a first portion on which a recording layer and/or a reflecting film layer are formed, and said first portion including a second portion on which plural pairs of pre-pits are formed for generating a tracking error signal, the substrate having a thickness of 1 mm or less at least in said first portion.

9. A substrate for an optical disc according to claim 8, wherein said substrate has a thickness in at least said first portion of 0.1 mm or greater.

10. A substrate for an optical disc according to claim 8, wherein said substrate has a thickness in at least said first portion of 0.8 mm.

* * * * *